United States Patent
Beall et al.

(10) Patent No.: US 6,933,255 B2
(45) Date of Patent: Aug. 23, 2005

(54) BETA-SPODUMENE CERAMICS FOR HIGH TEMPERATURE APPLICATIONS

(76) Inventors: Douglas M. Beall, 39 Overbrook Rd., Painted Post, NY (US) 14870; George H. Beall, 16 Woodland Dr., Big Flats, NY (US) 14814

( * ) Notice: Subject to any disclaimer, the term of this patent is extended or adjusted under 35 U.S.C. 154(b) by 0 days.

(21) Appl. No.: 10/611,504

(22) Filed: Jun. 30, 2003

(65) Prior Publication Data

US 2004/0266600 A1 Dec. 30, 2004

(51) Int. Cl.$^7$ ............................................. C04B 35/19
(52) U.S. Cl. ...................... 501/128; 501/120; 501/122; 501/153; 501/154
(58) Field of Search ............................. 501/7, 118–120, 501/122, 128, 153, 154

(56) References Cited

U.S. PATENT DOCUMENTS

| | | | |
|---|---|---|---|
| 3,600,204 A | 8/1971 | Beall et al. | |
| 3,839,001 A | 10/1974 | Adams et al. | |
| 4,301,214 A | * 11/1981 | Crandall | ...................... 428/446 |
| 4,595,662 A | * 6/1986 | Mochida et al. | ............... 501/15 |
| 5,179,051 A | * 1/1993 | Bedard et al. | ............... 501/128 |
| 5,403,787 A | 4/1995 | Day | |
| 5,962,351 A | 10/1999 | Chyung et al. | |

FOREIGN PATENT DOCUMENTS

| | | | | |
|---|---|---|---|---|
| EP | 997448 A | * | 5/2000 | |
| JP | 55067563 A | * | 5/1980 | |

* cited by examiner

*Primary Examiner*—David Sample
(74) *Attorney, Agent, or Firm*—Anca C. Gheorghiu; Kees van der Sterre

(57) ABSTRACT

A method of preparing beta-spodumene bodies from a plastic batch comprised entirely of minerals, absent a glass component. The resulting structure has a stoichiometry of 1:1:4 ($Li_2O:Al_2O_3:SiO_2$) to 1:1:11 ($Li_2O:Al_2O_3:SiO_2$), and exhibits a low coefficient of thermal expansion, high porosity and high strength, and is suitable for automotive catalytic converter substrates requiring a fast light-off time. There is also provided a ceramic article having a solid-solution of beta-spodumene ranging in molar ratio from 1:1:4 $Li_2O$—$Al_2O_3$—$SiO_2$ to 1:1:11 $LiO_2$—$Al_2O_3$—$SiO_2$ wherein a component selected from the group consisting of magnesium oxide (MgO), manganese oxide (MnO), and cobalt oxide (CoO) is substituted for lithium oxide ($LiO_2$) at 10 to 65 mole %, and optionally a minor phase of mullite ($3Al_2O_3$-$2SiO_2$) in an amount of up to 50% by weight.

23 Claims, No Drawings

BETA-SPODUMENE CERAMICS FOR HIGH TEMPERATURE APPLICATIONS

BACKGROUND OF THE INVENTION

The present invention relates to ceramic articles based on solid solutions of beta-spodumene and a method of fabricating the same. Specifically, the invention relates to beta-spodumene ceramics having low thermal expansion, high porosity and high strength for use in high temperature applications, including automotive emissions control systems, and a method of fabricating such ceramics absent a glass component.

Cordierite ceramics have found broad use in automotive emissions control systems, including but not limited to automotive catalytic converter substrates and diesel particulate filters. When applied with a high-surface-area "washcoat" and noble metal catalysts, a cordierite catalytic converter device is highly efficient at reducing emission of CO, hydrocarbons, and nitrogen oxides (NOx) once the converter has been heated to a critical temperature by the exhaust. However, during the initial heat-up of the exhaust system, the converter is too cold to function adequately, and substantial amount of "cold-start" emissions are released from the tail pipe. Increasingly stringent government legislation for mobile emissions have resulted in efforts to reduce the time to light-off, and resulting "cold-start" emissions. One solution has been the emergence of substrates with thinner walls and increased porosity to lower the thermal mass (heat capacity per unit volume) of the converter for faster heat-up. However, new "ultra-thin-wall" cordierite substrates which have typical cell densities of 900 cells/inch$^2$ (cpsi) or more, and wall thickness of 0.0027 inches (2.7 mils) or less, have insufficient strength. High strength is required to survive handling, canning and vibration in use.

For diesel particulate filter, cordierite has been the cost-effective material of choice due to its combination of low CTE, good thermal shock resistance, good strength, filtration efficiency, and low cost. However, the pressure of cordierite filters has been unsatisfactory high. A recent trend in the efforts to reduce the pressure drop in cordierite filters has been to increase the porosity. However, the increased porosity in combination with the inherent microcracking of the cordierite structure limit the strength thereof. A higher porosity would also be advantageous for the application of a catalyst system to the filter. Similarly to catalytic converter substrates, catalyst systems for filter use promote the conversion of carbon monoxide and unburned hydrocarbons in the exhaust stream to carbon dioxide and water. These catalyst systems are generally comprised of a mixture of highly dispersed noble metal catalyst supported on a high surface area metal oxide, and typically reside primarily within the pores of the filter walls to form a thin coating therein.

Lithium aluminosilicate (LAS) ceramics are known for combining low thermal expansion with high strength, and thermal durability. U.S. Pat. Nos. 3,600,204, 3,839,001, 5,403,787 and 5,962,351 disclose ceramics based on solid solutions of beta-spodumene for heat regenerator applications. LAS ceramics of this kind may therefore be suitable for application in automotive catalytic converter systems and diesel particulate filters. However, a disadvantage associated therewith is a high level of lithium in the structure. It has been found that lithium acts to poison the aforementioned noble metal catalyst systems. Another disadvantage resides in the fabrication of these structures which involves an extrusion process of batches based on glass powders. Glass batches are difficult to extrude requiring large amounts of binders and plasticizers. Also, it is difficult to control a uniform crystallization process.

It would be advantageous to employ beta-spodumene based ceramics for automotive catalytic converter substrate and diesel particulate filter applications, and to manufacture such articles without the use of a glass component. It would also be advantageous to obtain beta-spodumene based ceramic articles having lower levels of lithium for improved catalyst application and performance, while maintaining high strength, low thermal expansion and high porosity.

SUMMARY OF THE INVENTION

In one aspect of the invention there is provided a method of manufacturing ceramic bodies comprised predominately of a beta-spodumene solid solution manufactured from batches formulated entirely of mineral raw materials, without the addition of glass powder. The method of manufacturing includes the steps of forming a plastic batch comprising inorganic raw material powders, organic additives, and a liquid component, wherein the inorganic raw material powders are composed of minerals selected to react and form a solid solution of beta-spodumene. The plastic batch is then shaped into a green fired structure, dried and fired for a time and a temperature sufficient to form a structure having predominately a beta-spodumene phase.

In another aspect of the invention there is provided a ceramic article comprising predominantly a solid-solution of beta-spodumene ranging in molar ratio from 1:1:4 $Li_2O$—$Al_2O_3$—$SiO_2$ to 1:1:11 $Li_2O$—$Al_2O_3$—$SiO_2$ wherein magnesium oxide (MgO), manganese oxide (MnO), or cobalt oxide (CoO) is substituted for lithium oxide ($Li_2O$) at 10 to 65 mole %, preferably 25 to 50 mole %. In one embodiment the ceramic article further comprises a minor phase of mullite ($3Al_2O_3$-$2SiO_2$) in an amount of up to 50% by weight. Beta-spodumene ceramic articles of this type have a limited amount of lithium for improved catalyst lifetime resistance, in combination with high strength, low thermal expansion and high porosity.

DETAILED DESCRIPTION OF THE INVENTION

The present invention relates to a method of fabricating beta-spodumene based ceramic articles absent a glass component. Specifically, the inventive method involves formulating a plastic batch of inorganic raw materials entirely composed of minerals selected to react and form a solid solution of beta-spodumene. The absence of glass in the extrusion batch eliminates the requirement of preparing, melting and grinding such a component to form a powdered raw material for extrusion use. As a result significant cost improvements are possible in the manufacturing process. Furthermore, the use of glass aids the sintering of the ceramic structure during firing, necessarily reducing the porosity in the final product. As described high porosity is desirable in the present beta-spodumene articles, for example, for reduced heat capacity and/or improved catalyst application. By eliminating the glass component, the porosity may be increased while maintaining the high strength inherently associated with beta-spodumene ceramics.

The minerals suitable for purposes of the present invention are sources of alumina, silica and lithium oxide. Such sources include aluminosilicate minerals, such as petalite ($LiAlSi_4O_{10}$), kaolin both hydrous ($Al_2Si_2O_5(OH)_4$) and calcined ($3Al_2O_3$-$2SiO_2$), silicates such as talc ($Mg_3Si_4O_{10}$ (OH)$_2$), carbonates such as lithium carbonate (Li$_2$CO$_3$), magnesium carbonate (MgCO$_3$), oxides, such as alumina (Al$_2$O$_3$), silica (SiO$_2$), magnesium oxide (MgO), magnesium hydroxide (MgOH$_2$), manganese carbonate (MnCO$_3$) and, cobalt oxide (Co$_3$O$_4$).

The particle size of the mineral components must be fine enough and narrow in particle size distributions to be suitable for the forming (extrusion) process. Fine particle size of minerals is also required to prevent formation of very large anisotropic beta-spodumene grains in the final product. Too large a grain leads to microcracking of the beta-spodumene bodies that in turn results in expansion hysteresis and lowering of the strength of the body. Typical particle sizes for the minerals are less than 50 micrometers, preferably less than 10 micrometers. It is important that the particle size of the petalite raw material be less than 10 micrometers.

To further increase porosity in the final product structure, optionally a pore forming material is added to the raw materials. The pore former may be any natural or synthetic material capable of forming relic pores by evaporation or combustion during firing, such as carbon, coke, graphite, starch, flour, cellulose, or a synthetic organic polymer such as a polyacrylate, polyethylene, or polystyrene. The morphology of the pore forming agent may be platey, fibrous, spheroidal, or other shape. The median particle diameter of the pore forming agent is between 5 $\mu$m and 90 $\mu$m, preferably between 7 $\mu$m and 60 $\mu$m, and more preferably between 10 and 40 $\mu$m. The pore former is added as a super-addition computed as 100(mass of pore forming agent)/(mass of cordierite-forming raw materials).

The powdered raw materials, optionally together with the pore former, are mixed with organic additives and a liquid component which impart both an extrudable consistency and good green strength to the compounded batch. For purposes of the present invention organic additives include those known in the art such as binder, lubricant, plasticizer, and similar extrusion aids. Preferably, an organic binder, such as cellulose ether binder is added. Some typical cellulose ether binders especially suitable for the practice of the present invention are methylcellulose, and methylcellulose derivatives, such hydroxypropyl methylcellulose. Preferably, the mixture further include a lubricant selected from the group consisting of sodium stearate, stearic acid and oleic acid.

The liquid component can be inorganic, i.e., consisting largely of water, or can be organic. The use of water is preferred, although evaporable organic liquids such as the lower alkanols can be wholly or partly substituted thereof as desired. The weight percents of the organic additives and water are calculated as superadditions with respect to the mineral raw materials. In a preferred embodiment the organic additives and water are added in amounts of 2–10% cellulose ether binder, preferably methylcellulose, hydroxypropyl methylcellulose, or mixtures thereof, 0.2–2% lubricant, preferably sodium stearate, stearic acid or oleic acid, and 20–35% by weight water.

The batch of components is mixed in a conventional high shear mixture such as a muller-mixer. Thereafter the batches are extruded in accordance with conventional extrusion practice, preferably to form honeycomb structures. This typically involve extrusion through a honeycomb die well known to those versed in the art. The honeycomb structure has an inlet end and an outlet end, and a multiplicity of cells extending from the inlet end to the outlet end, the cells being formed by walls which are porous. Preliminary drying of the green extruded honeycombs is beneficial since to facilitate the removal of the bulk of the liquid component at a controlled rate, to avoid cracking of the structure. Typical drying is at a temperature of 90°–120° C. at atmospheric pressure. The green bodies are fired at a temperature and for a time sufficient to accomplish burnout of the organic additives, particularly binder burnout, and formation of beta-spodumene solid solution. In general, heating to peak temperatures of 1200°–1300° C. for a period of 2–20 hours will be sufficient for this purpose.

The invention also relates to a ceramic article comprising predominantly a solid-solution of beta-spodumene ranging in molar ratio from 1:1:4 Li$_2$O—Al$_2$O$_3$—SiO$_2$ to 1:1:11 Li$_2$O—Al$_2$O$_3$—SiO$_2$ wherein magnesium oxide (MgO), manganese oxide (MnO), or cobalt oxide (CoO) is substituted for lithium oxide (Li$_2$O) at 10 to 65 mole %, preferably 25 to 50 mole %. Inventive bodies may further include a minor phase of mullite (3Al$_2$O$_3$-2SiO$_2$) in an amount of up to 50% by weight.

It has been found that lithium promotes alkali poisoning of the catalyst washcoat. Substitutions of magnesium, manganese or cobalt for the lithium in the inventive beta-spodumene ceramic articles, as well as the addition of a minor phase of mullite, limit not only amount but also the mobility of lithium in the beta-spodumene solid solution without adversely affecting the beneficial properties of low thermal expansion and high strength. Furthermore, beta-spodumene has poor chemical durability. Specifically, in acid solutions an ion exchange of hydrogen for lithium may occur. It has been found that the addition of the aforementioned substituent species has been found to increase the chemical durability of beta-spodumene based bodies in acid environments.

In an embodiment, the inventive beta-spodumene ceramic articles exhibit: a low thermal expansion of less than $20 \times 10^{-7}$/° C. (22°–800° C.), preferably less than $10 \times 10^{-7}$/° C. (22°–800° C.), and more preferably less than $5 \times 10^{-7}$/° C. (22°–800° C.); a high strength, as provided by a modulus of rupture as measured on a solid rod of circular cross-section, of greater than 3000 psi, preferably greater than 6000 psi, and more preferably greater than 10000 psi; and, a high porosity greater than 20% by volume and up to 60% by volume, preferably greater than 30% by volume and up to 50% by volume, and more preferably greater than 35% by volume and up to 45% by volume.

In another preferred embodiment the inventive ceramic article is a monolithic structure, such as a honeycomb substrate. The honeycomb is characterized by a multicellular body having an inlet end and an outlet end, the multiplicity of cells extending from the inlet end to the outlet end and being formed by a plurality of porous walls. Such honeycomb bodies can have any cellular density and wall thickness as required by the application in use. Typical cellular densities include 400 cpsi (62 cells/cm$^2$) to 900 cpsi (140 cells/cm$^2$), and wall thickness of 4 mill or less (0.004 inch or less). In particular, the high strength inventive ceramic is particularly suitable for honeycomb structures having a cellular density of 900 cpsi and cell wall thickness of 4 mill or less. Honeycomb substrates having a high cellular density can be fabricated with thicker walls for higher strength but with higher porosities for improved light-off time.

In another embodiment part of the total number of cells at the inlet end of a honeycomb structure are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end, and the honeycomb structure could be used in a diesel particulate filter. This type of structure is particularly suitable for diesel exhaust filtration, and has cellular densities of 70–400 cpsi.

EXAMPLES

The invention may be further understood by reference to the following examples, which are intended to be illustrative rather than limiting. A commercially available cordierite body is provided as a comparative example (C1). Inventive examples (I1–I13) are prepared by mixing together selected mineral raw materials from Table 1 in proportions listed therein. 100 parts by weight of the dry ingredients (i.e., minerals) are mixed with about 4 to 6 parts by weight methyl cellulose and 0.5 to 1 part by weight sodium stearate. The contents are then plasticized with about 24 to 29 parts by weight deionized water and extruded through a die to provide multicellular body samples having a cell density of 400 cells per square inch (cpsi) and a cell wall thickness of 0.007 inch. Solid rods having a ⅜ inch diameter are also extruded for modulus of rupture (MOR) testing.

Some preferred sources of the mineral raw materials include petalite available from Industrial Corporation, alumina C701 RGE brand available from Alcan Chemicals, silica A-25 Imsil brand available from Unimim, Inc, hydrous kaolin K10 hydrous delaminated kaolin available from Dry Branch Kaolin Co., and calcined kaolin Glomax LL brand available from Dry Branch Kaolin Co.

The green bodies are dried and fired, with the drying being conducted for 12 hours at 80° C., and further heating to a top temperature of 1200° C.–1300° C., with a hold of 8 hours to develop a fired structure and determine the effect of firing on the final properties.

X-ray analysis is performed on the samples to determine the resulting phase assemblage. Mean coefficients of thermal expansion in units of $10^{-7}/°C.$ from 22°–800° C. are measured using a dilatometer. The porosity in units of % volume is characterized by mercury porosimetry. Four-point flexural strengths (MOR) is provided in pounds per square inch (psi). Compositional and property data is also provided in Table I.

The inventive samples fired to a much lower temperature than is necessary for the formation of cordierite, while exhibiting thermal expansion and porosity values comparable to those of cordierite. However, the measured strength exceeds that of cordierite, and in some instances as for inventive sample 3 it is nearly five times the strength of cordierite. To increase the porosity for some of the inventive samples a pore former may be added.

Therefore, in one aspect of the invention, beta-spodumene bodies of the type provided herein are suitable for substrate designs that are not possible with cordierite, i.e., substrate designs with very high cellular densities and very thin cell wall thickness which provide faster light-off time but have increased resistance to breakage and erosion. Further, it is possible to obtain a beta-spodumene ceramic article with high porosity in combination with strength comparable or greater than cordierite with low porosity. The high porosity beta-spodumene ceramic article could be produced with thicker cell walls, while still maintaining a fast light-off time. Therefore, the light-off time could be manipulated in honeycomb substrates comprising the inventive ceramic bodies, and substantial savings in ease of manufacturing could be realized.

An advantage of the present invention is the formation of beta-spodumene based-ceramic bodies from mixtures comprising readily-available minerals without the need to produce expensive and time-consuming glass components. Further, the resulting ceramic bodies made in accordance with the method of the invention combine low thermal expansion, high strength and high porosity and can be used in automotive catalytic converter applications requiring fast light-off times.

While the present invention has been described in detail with respect to certain illustrative and specific embodiments thereof, it should not be considered limited to such but may be used in other ways without departing from the spirit of the invention and the scope of the appended claims.

TABLE I

| | Sample | | | | | | |
|---|---|---|---|---|---|---|---|
| | C1 | I1 | I2 | I3 | I4 | I5 | I6 |
| Batch Minerals (wt. %) | | | | | | | |
| Petalite | | 58.10% | 49.80% | 69.10% | 86.50% | 58.61% | 74.51% |
| Delaminated Hydrous Clay | 15.40% | 9.40% | 10.38% | 14.60% | 13.80% | 9.48% | 15.76% |
| Silica | 2.00% | 28.30% | 35.82% | | | 25.10% | 6.21% |
| Talc | 40.80% | | | | | 3.86% | 3.48% |
| Lithium Carbonate | | 4.10% | 4.00% | | | 2.53% | |
| Cobalt Oxide | | | | | | | |
| Calcined Kaolin | 26.50% | | | 5.20% | | | |
| Alumina | 15.40% | | | 7.50% | | | |
| Manganese Carbonate | | | | | | | |
| Oxides (wt. %) | | | | | | | |
| $Li_2O$ | | 4.38% | 3.95% | 3.47% | 3.85% | 3.72% | 3.33% |
| $Al_2O_3$ | 35.00% | 15.20% | 13.96% | 24.59% | 22.27% | 15.27% | 20.86% |
| $SiO_2$ | 51.40% | 80.42% | 82.09% | 71.94% | 73.88% | 79.71% | 74.64% |
| MgO | 13.60% | | | | | 1.31% | 1.17% |
| CoO | | | | | | | |
| MnO | | | | | | | |
| Properties | | | | | | | |
| CTE, 25–800° C. $(10^{-7}°C.^{-1})$ | | | | | | | |
| 1200°/8 hr | | | | | | | |

TABLE I-continued

|  |  |  |  |  |  |  |  |
|---|---|---|---|---|---|---|---|
| 1225°/8 hr |  | −3.7 |  |  | 7 |  | 14.6 |
| 1250°/8 hr |  | 0.1 | 3.8 | 14.5 | 8.4 | 4.7 | 9.9 |
| 1275°/8 hr |  | −2.2 |  | 15.3 | 8 |  | 9.7 |
| 1300°/8 hr |  |  |  | 17.2 | 8.7 |  |  |
| 1400°/8 hr | 6.0 |  |  |  |  |  |  |
| Porosity (% volume) |  |  |  |  |  |  |  |
| 1200°/8 hr |  |  |  |  |  |  |  |
| 1225°/8 hr |  | 37.69% |  |  | 35.81% |  | 34.93% |
| 1250°/8 hr |  | 33.5% | 33.17% | 32.9% | 34.2% | 29.13% | 32.2% |
| 1275°/8 hr |  | 36.1% |  | 23.9% | 22.2% |  | 27.1% |
| 1300°/8 hr |  |  |  | 6.5% | 5.6% |  |  |
| 1400°/8 hr | 36.0% |  |  |  |  |  |  |
| MOR (psi) |  |  |  |  |  |  |  |
| 1200°/8 hr |  |  |  |  |  |  |  |
| Std. Dev n = 5 |  |  |  |  |  |  |  |
| 1225°/8 hr |  | 4830 |  |  | 5395 |  | 5394 |
| Std. Dev n = 5 |  | 358 |  |  | 719 |  | 381 |
| 1250°/8 hr |  | 4806.2 | 3884.2 | 6884.9 | 5839.6 | 3793 | 6009.8 |
| Std. Dev n = 5 |  | 798.5 | 269.6 | 806.9 | 871 | 223 | 557.2 |
| 1400°/8 hr | 2560 |  |  |  |  |  |  |

|  | Sample |  |  |  |  |  |  |
|---|---|---|---|---|---|---|---|
|  | I7 | I8 | I9 | I10 | I11 | I12 | I13 |
| Batch Minerals (wt. %) |  |  |  |  |  |  |  |
| Petalite | 55.25% | 64.78% | 50.15% | 63.01% | 56.54% | 71.08% | 58.22% |
| Delaminated Hydrous Clay | 12.01% | 15.97% | 15.27% | 15.21% | 15.22% | 15.16% | 13.65% |
| Silica | 28.83% | 19.26% | 17.85% | 11.33% | 7.68% | 0.26% | 19.12% |
| Talc | 3.91% |  |  |  |  |  |  |
| Lithium Carbonate |  |  |  |  |  |  |  |
| Cobalt Oxide | 3.39% | 6.76% | 8.86% | 7.42% | 9.99% | 8.37% |  |
| Calcined Kaolin |  |  | 7.86% | 3.02% | 10.57% | 5.13% |  |
| Alumina |  |  |  |  |  |  |  |
| Manganese Carbonate |  |  |  |  |  |  | 9.34% |
| Oxides (wt. %) |  |  |  |  |  |  |  |
| $Li_2O$ | 2.36% | 2.70% | 2.23% | 2.81% | 2.52% | 3.18% | 2.66% |
| $Al_2O_3$ | 14.91% | 17.80% | 19.67% | 19.85% | 22.24% | 22.47% | 17.25% |
| $SiO_2$ | 78.28% | 73.30% | 69.43% | 70.06% | 65.43% | 66.10% | 73.87% |
| MgO | 1.26% |  |  |  |  |  |  |
| CoO | 3.19% | 6.20% | 8.67% | 7.29% | 9.80% | 8.25% |  |
| MnO |  |  |  |  |  |  | 6.22% |
| Properties |  |  |  |  |  |  |  |
| CTE, 25–800° C. $(10^{-7}$ ° $C.^{-1})$ |  |  |  |  |  |  |  |
| 1200°/8 hr |  |  |  |  |  |  | 10.5 |
| 1225°/8 hr | 17.7 | 5.1 | 18.5 | 6.5 | 10.2 | 6.1 |  |
| 1250°/8 hr | 17 | 6.6 | 14.5 | 5.8 | 11.7 | 5.9 |  |
| 1275°/8 hr |  |  |  |  |  |  |  |
| 1300°/8 hr |  |  |  |  |  |  |  |
| 1400°/8 hr |  |  |  |  |  |  |  |
| Porosity (% volume) |  |  |  |  |  |  |  |
| 1200°/8 hr |  |  |  |  |  |  | 27.20% |
| 1225°/8 hr | 30.59% | 30.91% | 16.40% | 5.28% | 3.08% | 10.49% |  |
| 1250°/8 hr | 20.70% | 29.7% | 14.11% | 4.69% | 7.20% | 17.01% |  |
| 1275°/8 hr |  |  |  |  |  |  |  |
| 1300°/8 hr |  |  |  |  |  |  |  |
| 1400°/8 hr |  |  |  |  |  |  |  |
| MOR (psi) |  |  |  |  |  |  |  |
| 1200°/8 hr |  |  |  |  |  |  | 3076.6 |
| Std. Dev n = 5 |  |  |  |  |  |  | 135.1 |
| 1225°/8 hr | 3382.2 | 4376 | 3990 | 5286 | 6381 | 4894 |  |
| Std. Dev n = 5 | 179.5 | 321 | 467 | 558 | 923 | 156 |  |
| 1250°/8 hr | 5201.8 | 11393 | 4801 | 7771 | 9221 | 6698 |  |
| Std. Dev n = 5 | 389.7 | 703.9 | 718 | 716 | 635 | 801 |  |
| 1400°/8 hr |  |  |  |  |  |  |  |

What is claimed:

1. A method for forming a ceramic body based on a solid solution of beta-spodumene, the method comprising:

a. forming a plastic batch comprising inorganic raw material powders, organic additives, and a liquid component, wherein the inorganic raw material powders are composed of minerals selected to react and form a solid solution of beta-spodumene and from which glass components are absent;

b. shaping the plastic batch into a green fired structure; and, c. drying and firing the green structure for a time and a temperature sufficient to form a structure comprising predominately a beta-spodumene phase having a stoichiometry of 1:1:4 ($Li_2O:Al_2O_3:SiO_2$) to 1:1:11 ($Li_2O:Al_2O_3:SiO_2$) and exhibiting a porosity greater than 20% by volume and up to 60% by volume.

2. The method of claim 1 wherein the minerals comprising the inorganic raw materials are sources of alumina, silica and lithium oxide.

3. The method of claim 2 wherein the mineral comprising the inorganic raw materials are selected from the group consisting of petalite, hydrous kaolin, calcined kaolin, alumina, lithium carbonate, silica, talc, magnesium oxide, magnesium carbonate, magnesium hydroxide, cobalt oxide, and mixtures thereof.

4. The method of claim 1 wherein the organic additives are selected from the group consisting of binder, lubricant, plasticizer, solvent, and mixtures thereof.

5. The method of claim 4 wherein the organic additives are a cellulose ether binder, and a lubricant selected from the group consisting of sodium stearate, stearic acid and oleic acid.

6. The method of claim 5 wherein the mixture comprises based on 100% by weight minerals, 2–10% cellulose ether binder, 0.2–2% lubricant selected from the group consisting of sodium stearate, stearic acid and oleic acid, and 20–35% by weight water as the liquid component.

7. The method of claim 1 wherein the shaping of the plastic batch is done by extrusion.

8. The method of claim 7 wherein the plastic batch is shaped into a honeycomb structure with an inlet end, an outlet end, and a multiplicity of cells extending from the inlet end to the outlet end, the cells being formed by a plurality of porous walls.

9. The method of claim 1 wherein the firing is done at 1200°–1300° C. for a period of 2–20 hours.

10. The method of claim 1 wherein a component selected from the group consisting of magnesium oxide (MgO), manganese oxide (MnO), and cobalt oxide (CoO) is substituted for lithium oxide ($Li_2O$) at 10 to 65 mole %.

11. The method of claim 10 wherein a component selected from the group consisting of magnesium oxide (MgO), manganese oxide (MnO), and cobalt oxide (CoO) is substituted for lithium oxide ($Li_2O$) at 25 to 50 mole %.

12. The method of claim 11 wherein the structure further comprises a minor phase of mullite ($3Al_2O_3$-$2SiO_2$) in an amount of up to 50% by weight.

13. A ceramic article comprising predominantly a solid-solution of beta-spodumene ranging in molar ratio from 1:1:4 $Li_2O$—$Al_2O_3$—$SiO_2$ to 1:1:11 $Li_2O$—$Al_2O_3$—$SiO_2$ and exihibiting a porosity greater than 20% by volume and up to 60% by volume, wherein a component selected from the group consisting of magnesium oxide (MgO), manganese oxide (MnO), and cobalt oxide (CoO) is substituted for lithium oxide ($Li_2O$) at 10 to 65 mole %.

14. The ceramic article of claim 13 wherein a component selected from the group consisting of magnesium oxide (MgO), manganese oxide (MnO), and cobalt oxide (CoO) is substituted for lithium oxide ($Li_2O$) at 25 to 50 mole %.

15. The ceramic article of claim 13 further comprising a minor phase of mullite ($3Al_2O_3$-$2SiO_2$) in an amount of up to 50% by weight.

16. The ceramic article of claim 13 exhibiting a coefficient of thermal expansion (22°–800° C.) of less than $20\times10^{-7}$/° C.

17. The ceramic article of claim 16 exhibiting a coefficient of thermal expansion (22°–800° C.) of less than $10\times10^{-7}$/° C.

18. The ceramic article of claim 17 exhibiting a coefficient of thermal expansion (22°–800° C.) of less than $5\times10^{-7}$/° C.

19. The ceramic article of claim 13 exhibiting a modulus of rupture as measured on a solid rod of circular cross-section, of greater than 3000 psi.

20. The ceramic article of claim 19 exhibiting a modulus of rupture as measured on a solid rod of circular cross-section, of greater than 6000 psi.

21. The ceramic article of claim 20 exhibiting a modulus of rupture as measured on a solid rod of circular cross-section, of greater than 10000 psi.

22. The ceramic article of claim 13 exhibiting a porosity greater than 30% by volume and up to 50% by volume.

23. The ceramic article of claim 22 exhibiting a porosity greater than 35% by volume and up to 45% by volume.

* * * * *

UNITED STATES PATENT AND TRADEMARK OFFICE
CERTIFICATE OF CORRECTION

PATENT NO. : 6,933,255 B2
DATED : August 23, 2005
INVENTOR(S) : Beall et al.

It is certified that error appears in the above-identified patent and that said Letters Patent is hereby corrected as shown below:

<u>Title page,</u>
Item [57], ABSTRACT,
Lines 10 and 13, "$LiO_2$" should be -- $Li_2O$ --.

<u>Column 10,</u>
Line 11, "exihibiting" should be -- exhibiting --.

Signed and Sealed this

Tenth Day of January, 2006

JON W. DUDAS
*Director of the United States Patent and Trademark Office*